(No Model.)

H. BARKOW.
TRUCK.

No. 288,687. Patented Nov. 20, 1883.

Witnesses:
E. G. Asmus
M. Kaumheimer

Inventor:
Herman Barkow
By
Stout & Underwood
Attorneys.

N. PETERS, Photo-Lithographer, Washington, D. C.

UNITED STATES PATENT OFFICE.

HERMAN BARKOW, OF MILWAUKEE, WISCONSIN.

TRUCK.

SPECIFICATION forming part of Letters Patent No. 288,687, dated November 20, 1883.

Application filed April 30, 1883. (No model.)

*To all whom it may concern:*

Be it known that I, HERMAN BARKOW, of Milwaukee, in the county of Milwaukee, and in the State of Wisconsin, have invented certain new and useful Improvements in Trucks; and I do hereby declare that the following is a full, clear, and exact description thereof.

My invention relates to trucks or heavy wagons, and will be more fully set forth hereinafter.

Figure 1:
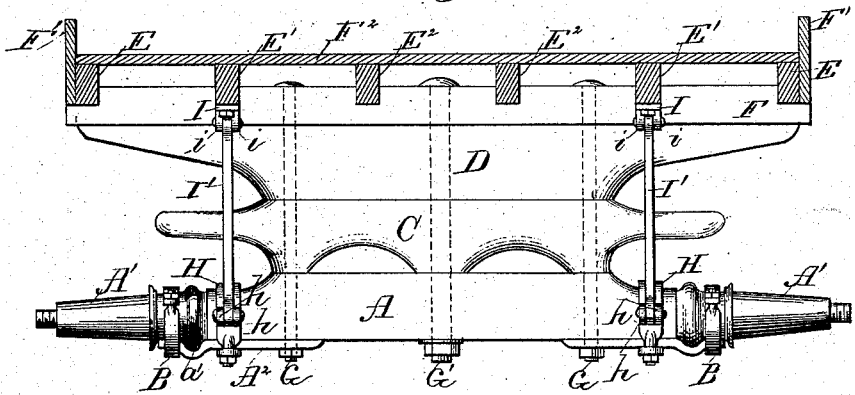
Figure 2:
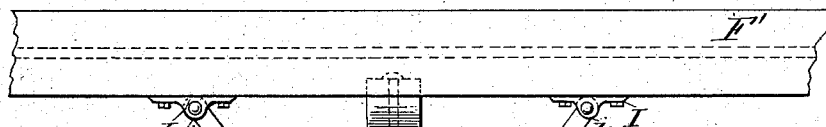
Figure 3:
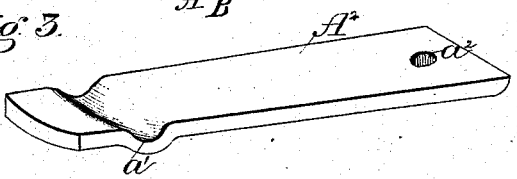

In the drawings, Figure 1 is an elevation of the rear gear. Fig. 2 is a side view of the same, and Fig. 3 is a detail.

A is the axle, above which is the sand-bar C. D is the bolster resting on the sand-bar, and this bolster supports the sills E E' E², &c., of the platform F².

F shows one of the cross-sills under the longitudinal sills E E', &c., the sill F (shown in Fig. 1) being in front of the bolster D, which rises to the same height; and F' F' are the side boards of the platform F².

Bolts G G' G pass through the bolster, sand-bar, and axle, and are secured by nuts underneath the latter.

The axle is provided with iron skeins A' at each end, and these are supported by the irons A², which are provided with the depressions $a'$ to receive the rear circular flanges of the skeins, and with the holes $a^2$ to enable the bolts G to pass therethrough. The outer ends of these irons A² are secured to the skeins by clips B B, while other clips, H H, secure the irons to the axle between the inner ends of the skeins and the bolts G G. These clips H H have a pair of ears, $h\ h$, formed on each side thereof, integral therewith, and one end of a brace, I', is pivoted between each pair of these ears $h\ h$, while the other ends of the said braces I' are pivoted between similar ears, $i\ i$, on plates I, which are bolted to the under side of the platform-sills E' E', and thus I brace and support my platform directly from the axle of the truck without cross-trusses or bolsters, and dispense with a reach between my front and rear trucks; but as the front truck is of ordinary construction I have not deemed it necessary to illustrate it here. As I use a circle with said front truck, of course I cannot there employ my braces I'; but I support the skeins of the front axle by irons A², clipped thereto, just as illustrated in connection with the rear axle, shown in the drawings.

The irons A² not only serve to support the skeins, and also to strengthen the axle at the points where they are applied, but by reason of their described depressions $a'$ they prevent the skeins from slipping off the ends of the axle or becoming loose thereon, as the circular flanges on the rear part of the skeins fit within the depressions in the irons when the latter have been clipped to place, as described.

Having thus described my invention, what I claim as new, and desire to secure by Letters Patent, is—

1. In a truck or heavy wagon, the combination of the axle, sand-bar, bolster, and platform with the braces I' I', extending from the under side of the platform to the axle, in the direction of the length of the truck, and pivotally secured at each end between ears $h\ h$ on the clips H, and between ears $i\ i$ on plates I, respectively, substantially as set forth.

2. In combination with the axle of a truck, the skeins A', having rear circular flanges, and the supporting-irons A², one to each skein, independent of and detachable from said skeins, and each provided with the depression $a'$, adapted to receive the said circular flanges of the skeins, and all the parts adapted to be secured together by clips, substantially as set forth.

3. In a truck or heavy wagon, the combination of the axle, sand-bar, bolster, and platform with the skeins A', supporting-irons A², clips B and H, plates I, ears $i\ i$ and $h\ h$, and braces I' I', extending from platform to axle, lengthwise of the truck, substantially as set forth.

In testimony that I claim the foregoing I have hereunto set my hand, on this 24th day of March, 1883, in the presence of two witnesses.

HERMAN BARKOW.

Witnesses:
H. G. UNDERWOOD,
M. KAUMHEIMER.